United States Patent
Wenzel et al.

(10) Patent No.: US 6,960,549 B2
(45) Date of Patent: Nov. 1, 2005

(54) CATALYST MODIFIERS AND THEIR USE IN THE POLYMERIZATION OF OLEFIN(S)

(75) Inventors: Timothy T. Wenzel, Charleston, WV (US); Dick A. Nagaki, South Charleston, WV (US); Simon Mawson, Charleston, WV (US); David James Schreck, Cross Lanes, WV (US); Thomas H. Peterson, Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 631 days.

(21) Appl. No.: 09/932,520

(22) Filed: Aug. 17, 2001

(65) Prior Publication Data

US 2003/0207753 A1 Nov. 6, 2003

Related U.S. Application Data

(62) Division of application No. 09/392,421, filed on Sep. 9, 1999, now Pat. No. 6,346,584.

(51) Int. Cl.$^7$ .......................... B01J 31/00; B01J 37/00; C08F 4/02; C08F 4/60
(52) U.S. Cl. ................ 502/125; 502/129; 502/133; 502/120
(58) Field of Search ............................. 502/125, 129, 502/133, 170; 526/74, 82, 90, 128, 170

(56) References Cited

U.S. PATENT DOCUMENTS

| | | | | |
|---|---|---|---|---|
| 3,082,198 A | * | 3/1963 | Klein | 502/125 |
| 4,942,147 A | | 7/1990 | Karol et al. | 502/113 |
| 5,362,823 A | | 11/1994 | Karol et al. | 526/114 |
| 6,346,584 B1 | * | 2/2002 | Wenzel et al. | 526/82 |
| 6,369,174 B1 | | 4/2002 | Wenzel et al. | 526/74 |

FOREIGN PATENT DOCUMENTS

| | | |
|---|---|---|
| EP | 0630910 A1 | 12/1994 |
| EP | 0829491 A2 | 3/1998 |

OTHER PUBLICATIONS

Computer–based EAST search of US patents and pre–grant publications showing how many such documents exist in only the USPTO database for all catalysts (502/102–355) and for only molecular catalysts, i.e. not monoliths, metal oxides, zeolites, etc. (502/102–185), search run Apr. 8, 2004.*

* cited by examiner

Primary Examiner—Mark L. Bell
Assistant Examiner—J. Pasterczyk
(74) Attorney, Agent, or Firm—Jaimes Sher; Kevin M. Faulkner

(57) ABSTRACT

The present invention relates to the use of at least one acid and at least one base and/or at least one reductant and at least one oxidant that when used with a polymerization catalyst in a polymerization process results in the controllable generation of a catalyst inhibitor that renders the polymerization catalyst substantially or completely inactive.

12 Claims, No Drawings

CATALYST MODIFIERS AND THEIR USE IN THE POLYMERIZATION OF OLEFIN(S)

RELATED APPLICATION DATA

This application is a Divisional of U.S. patent application, Ser. No. 09/392,421, filed Sep. 9, 1999, now issued as U.S. Pat, No. 6,346,584.

FIELD OF THE INVENTION

The present invention relates to a method for improving operability in a process for polymerizing olefin(s). In particular, the invention is directed to a method for controlling the kinetics of an olefin polymerization catalyst.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes.

Especially illustrative of these advances is the development of technology utilizing bulky ligand metallocene-type catalyst systems. Regardless of these technological advances in the polyolefin industry, common problems, as well as new challenges associated with process operability still exist. For instance, the tendency for a gas phase or slurry phase process to foul and/or sheet remains a challenge using any olefin polymerization catalyst.

For example, in a continuous slurry process fouling on the walls of the reactor, which act as a heat transfer surface, can result in many operability problems. Poor heat transfer during polymerization can result in polymer particles adhering to the walls of the reactor. These polymer particles can continue to polymerize on the walls and can result in a premature reactor shutdown. Also, depending on the reactor conditions, some of the polymer may dissolve in the reactor diluent and redeposit on for example the metal heat exchanger surfaces.

In a typical continuous gas phase process, a recycle system is employed for many reasons including the removal of heat generated in the process by the polymerization. Fouling, sheeting and/or static generation in a continuous gas phase process can lead to the ineffective operation of various reactor systems. For example, the cooling mechanism of the recycle system, the temperature probes utilized for process control and the distributor plate, if affected, can lead to an early reactor shutdown.

Evidence of, and solutions to, various process operability problems have been addressed by many in the art. For example, U.S. Pat. Nos. 4,792,592, 4,803,251, 4,855,370 and 5,391,657 all discuss techniques for reducing static generation in a polymerization process by introducing to the process for example, water, alcohols, ketones, and/or inorganic chemical additives; European Patent EP 0 634 421 B1 discusses introducing directly into the polymerization process water, alcohol and ketones to reduce fouling. A PCT publication WO 97/14721 published Apr. 24, 1997 discusses the suppression of fines that can cause sheeting by adding an inert hydrocarbon to the reactor; U.S. Pat. No. 5,627,243 discusses a new type of distributor plate for use in fluidized bed gas phase reactors; PCT publication WO 96/08520 discusses avoiding the introduction of a scavenger into the reactor; U.S. Pat. No. 5,461,123 discusses using sound waves to reduce sheeting; U.S. Pat. No. 5,066,736 and EP-A1 0 549 252 discuss the introduction of an activity retarder to the reactor to reduce agglomerates; U.S. Pat. No. 5,610,244 relates to feeding make-up monomer directly into the reactor above the bed to avoid fouling and improve polymer quality; U.S. Pat. No. 5,126,414 discusses including an oligomer removal system for reducing distributor plate fouling and providing for polymers free of gels; EP-A1 0 453 116 published Oct. 23, 1991 discusses the introduction of antistatic agents to the reactor for reducing the amount of sheets and agglomerates; U.S. Pat. No. 4,012,574 discusses adding a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. Nos. 5,034,480 and 5,034,481 discuss a reaction product of a conventional Ziegler-Natta titanium catalyst with an antistat to produce ultrahigh molecular weight ethylene polymers; U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; and U.S. Pat. No. 3,919,185 describes a slurry process using a nonpolar hydrocarbon diluent using a conventional Ziegler-Natta-type or Phillips-type catalyst and a polyvalent metal salt of an organic acid.

There are various other known methods for improving operability including coating the polymerization equipment, for example, treating the walls of a reactor using chromium compounds as described in U.S. Pat. Nos. 4,532,311 and 4,876,320; injecting various agents into the process, for example PCT Publication WO 97/46599 published Dec. 11, 1997 discusses feeding into a lean zone in a polymerization reactor an unsupported, soluble metallocene-type catalyst system and injecting antifoulants or antistatic agents into the reactor; controlling the polymerization rate, particularly on start-up; and reconfiguring the reactor design.

Others in the art to improve process operability have discussed modifying the catalyst system by preparing the catalyst system in different ways. For example, methods in the art include combining the catalyst system components in a particular order; manipulating the ratio of the various catalyst system components; varying the contact time and/or temperature when combining the components of a catalyst system; or simply adding various compounds to the catalyst system. These techniques or combinations thereof are discussed in the literature. Especially illustrative in the art is the preparation procedures and methods for producing bulky ligand metallocene-type catalyst systems, more particularly supported bulky ligand metallocene-type catalyst systems with reduced tendencies for fouling and better operability. Examples of these include: WO 96/11961 published Apr. 26, 1996 discusses as a component of a supported catalyst system an antistatic agent for reducing fouling and sheeting in a gas, slurry or liquid pool polymerization process; U.S. Pat. No. 5,283,218 is directed towards the prepolymerization of a metallocene catalyst; U.S. Pat. Nos. 5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat. No. 5,492,975 discusses polymer bound metallocene-type catalyst systems; U.S. Pat. No. 5,661,095 discusses supporting a metallocene-type catalyst on a copolymer of an olefin and an unsaturated silane; PCT publication WO 97/06186 published Feb. 20, 1997 teaches removing inorganic and organic impurities after formation of the metallocene-type catalyst itself; PCT publication WO 97/15602 published May 1, 1997 discusses readily supportable metal complexes; PCT publication WO 97/27224 published Jul. 31, 1997 relates to forming a supported transition metal compound in the presence of an unsaturated organic compound having at least one terminal double bond; and EP-A2-811 638 discusses using a metallocene catalyst and an activating cocatalyst in a polymerization process in the presence of a nitrogen containing antistatic agent.

U.S. Pat. Nos. 4,942,147 and 5,362,823 discuss the addition of autoacceleration inhibitors to prevent sheeting.

While all these possible solutions might reduce the level of fouling or sheeting somewhat, some are expensive to employ and/or may not reduce fouling and sheeting to a level sufficient to successfully operate a continuous process, particularly a commercial or large-scale process.

Thus, it would be advantageous to have a polymerization process capable of operating continuously with enhanced reactor operability and at the same time produce new and improved polymers. It would also be highly beneficial to have a continuously operating polymerization process having more stable catalyst productivities, reduced fouling/sheeting tendencies and increased duration of operation.

SUMMARY OF THE INVENTION

This invention provides a method of making a new and improved catalyst composition, the catalyst composition itself and its use in a polymerizing process. Also, the invention is directed to the use of two or more different compounds in the presence of a polymerization catalyst that react at a specified temperature during a polymerization process to release at least one catalyst inhibitor. The most preferred compounds are acid and base combinations, specifically Bronsted acids and Bronsted bases, or an oxidant and a reductant combination.

The method comprises the step of combining, contacting, blending and/or mixing any catalyst system, preferably a supported catalyst system, with at least two different compounds, preferably with at least one acid compound and at least one base compound, such that at a specified temperature the two different compounds, preferably the acid compound and the base compound, react to form a catalyst inhibitor that deactivates the catalyst system. In the most preferred embodiment, the at least two different compounds, preferably the acid compound and base compound, react at a temperature above the polymerization temperature, reactor temperature, to form a catalyst inhibitor, more preferably a gaseous catalyst inhibitor. In one embodiment, the catalyst system comprises a conventional-type transition metal catalyst compound. In the most preferred embodiment the catalyst system comprises a bulky ligand metallocene-type catalyst compound. The combination or use of an olefin polymerization catalyst and the binary compounds, preferably the acid compound and the base compound, is useful in any olefin polymerization process. The preferred polymerization processes are a gas phase or a slurry phase process, most preferably a gas phase process.

In another preferred embodiment, the invention provides for a process for polymerizing olefin(s) in the presence of a polymerization catalyst, and at least two different compounds, preferably an acid compound and a base compound, in a reactor at an operating temperature, wherein the two different compounds, preferably the acid compound and base compound, react at a temperature above the operating temperature to form a catalyst inhibitor that reduces the effectiveness of the polymerization catalyst to polymerize olefin(s). In the most preferred embodiment, the catalyst inhibitor renders the polymerization catalyst inactive.

In yet another preferred embodiment, the invention is directed to a process for polymerizing olefin(s) in the presence of a polymerization catalyst in a reactor under polymerization conditions, the process comprising the steps (a) introducing at least one compound, preferably an acid compound; and (b) introducing at least one different compound, preferably a base compound, wherein two compounds, preferably the acid and the base compounds react in the reactor to form at least one catalyst inhibitor that reduces the effectiveness of the polymerization catalyst to polymerize olefin(s).

DETAILED DESCRIPTION OF THE INVENTION

Introduction

The invention is directed toward a method for making a catalyst composition and to the catalyst composition itself. The invention also relates to a polymerization process having improved operability using the catalyst composition. While not being bound to any particular theory, it is believed that one possible cause for reduced operability, especially sheeting and/or fouling, is the result of a catalyst's tendency to continue to polymerize well after its initial activation. It has been suprisingly discovered that using two or more compounds, preferably an acid compound and a base compound, or an oxidant and a reductant, that react to form a catalyst inhibitor in combination with a polymerization catalyst results in the ability to control the catalyst's tendency for continuing to effectively polymerize olefin(s). It has also been discovered that the reaction of the two or more compounds, preferably, the acid compound and the base compound, to form the catalyst inhibitor is controllable. In the most preferred embodiment, the reaction is controlled by changing the acid compound. The present invention is useful in all types of polymerization processes, especially a slurry or gas phase process.

Catalyst Components and Catalyst Systems

All polymerization catalysts including conventional-type transition metal catalysts and bulky ligand metallocene-type catalysts are suitable for use in the polymerizing process of the invention. The following is a non-limiting discussion of the various polymerization catalysts useful in the invention.

Conventional-Type Transition Metal Catalysts

Conventional-type transition metal catalysts are those traditional Ziegler-Natta catalysts and Phillips-type catalysts well known in the art. Examples of conventional-type transition metal catalysts are discussed in U.S. Pat. Nos. 4,115,639, 4,077,904, 4,482,687, 4,564,605, 4,721,763, 4,879,359 and 4,960,741 all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437 all of which are incorporated herein by reference.

Typically, these conventional-type transition metal catalyst compounds excluding some conventional-type chromium catalyst compounds are activated with one or more of the conventional-type cocatalysts described below.

Conventional-Type Cocatalysts

Conventional-type cocatalyst compounds for the above conventional-type transition metal catalyst compounds may be represented by the formula $M^3M^4{}_vX^2{}_cR^3{}_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds includes mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

$$L^A L^B M Q_n \tag{I}$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of $\eta$-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur, oxygen and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. Depending on the oxidation state of the metal, the value for n is 0, 1 or 2 such that formula (I) above represents a neutral bulky ligand metallocene-type catalyst compound.

In one embodiment, the bulky ligand metallocene-type catalyst compounds of the invention include those of formula (I) where $L^A$ and $L^B$ are bridged to each other by a bridging group, A, such that the formula is represented by $$L^A A L^B M Q_n \tag{II}$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging group A contains a carbon, silicon, iron or germanium atom, most preferably A contains at least one silicon atom or at least one carbon atom. The bridging group A may also contain substituent groups R as defined above including halogens. Non-limiting examples of bridging group A may be represented by $R'_2C$, $R'_2Si$, $R'_2Si$, $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363 and 5,856,547, 5,858,903, 5,859,158 and 5,929,266 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

$$L^C A J M Q_n \quad\quad\quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$$L^D M Q_2(YZ) X_n \quad\quad\quad (IV)$$

where M is a Group 3 to 16 metal, preferably a Group 4 to 12 transition metal, and most preferably a Group 4, 5 or 6 transition metal; LD is a bulky ligand that is bonded to M; each Q is independently bonded to M and $Q_2$(YZ) forms a uncharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference.

In another embodiment, the bulky ligand metallocene-type catalyst compounds are those described in PCT publications WO 99/01481 and WO 98/42664, which are fully incorporated herein by reference.

In one embodiment, the bulky ligand metallocene-type catalyst compound is represented by the formula:

$$((Z)XA_t(YJ))_q M Q_n \quad\quad\quad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

Other Bulky Ligand Metallocene-Type Catalyst Compounds

It is within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene-type catalysts are those Group 5 and 6 metal imido complexes described in EP-A2-0 816 384 and U.S. Pat. No. 5,851,945, which is incorporated herein by reference. In addition, bulky ligand metallocene-type catalysts include bridged bis(arylamido) Group 4 compounds described by D. H. McConville, et al., in Organometallics 1195, 14, 5478–5480, which is herein incorporated by reference. Other bulky ligand metallocene-type catalysts are described as bis(hydroxy aromatic nitrogen ligands) in U.S. Pat. No. 5,852,146, which is incorporated herein by reference. Other metallocene-type catalysts containing one or more Group 15 atoms include those described in WO 98/46651, which is herein incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, incorporated herein by reference) and mixtures thereof.

Activator and Activation Methods for the Bulky Ligand Metallocene-Type Catalyst Compounds The above described bulky ligand metallocene-type catalyst compounds are typically activated in various ways to yield catalyst compounds having a vacant coordination site that will coordinate, insert, and polymerize olefin(s), an activated polymerization catalyst.

For the purposes of this patent specification and appended claims, the term "activator" is defined to be any compound or component or method which can activate any of the bulky ligand metallocene-type catalyst compounds of the invention as described above. Non-limiting activators, for example may include a Bronsted acid or a non-coordinating ionic activator or ionizing activator or any other compound including Bronsted bases, aluminum alkyls, conventional-type cocatalysts and combinations thereof that can convert a neutral bulky ligand metallocene-type catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene-type catalyst compound.

In one embodiment, an activation method using ionizing ionic compounds not containing an active proton but capable of producing both a bulky ligand metallocene-type catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166 and 5,856,256 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds useful as activators include triethylaluminum, triisobutylaluminum, trimethylaluminum, tri-n-hexyl aluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. Other activators include aluminum/boron complexes as described in EP 608 830 B1, which is herein incorporated by reference. WO 98/09996 incorporated herein by reference describes activating bulky ligand metallocene-type catalyst compounds with perchlorates, periodates and iodates including their hydrates. WO 98/30602 and WO 98/30603 incorporated by reference describe the use of lithium (2,2'-bisphenyl-ditrimethylsilicate).4THF as an activator for a bulky ligand metallocene-type catalyst compound. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859, 653 and 5,869,723 and PCT WO 98/32775, which are herein incorporated by reference.

It is also within the scope of this invention that the above described bulky ligand metallocene-type catalyst compounds can be combined with one or more of the catalyst compounds represented by formulas (I) through (V) with one or more activators or activation methods described above.

It is further contemplated by the invention that other catalysts can be combined with the bulky ligand metallocene-type catalyst compounds of the invention. For example, see U.S. Pat. Nos. 4,937,299, 4,935,474, 5,281,679, 5,359,015, 5,470,811, and 5,719,241 all of which are herein fully incorporated herein reference. It is also contemplated that any one of the bulky ligand metallocene-type catalyst compounds of the invention have at least one fluoride or fluorine containing leaving group as described in U.S. application Ser. No. 09/191,916 filed Nov. 13, 1998.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Supports, Carriers and General Supporting Techniques

The above described conventional-type transition metal catalyst compounds and catalyst systems and bulky ligand metallocene-type catalyst compounds and catalyst systems may be combined with one or more support materials or carriers using one of the support methods well known in the art or as described below. For example, in a most preferred embodiment, a bulky ligand metallocene-type catalyst compound or catalyst system is in a supported form, for example deposited on, contacted with, vapourized with, bonded to, or incorporated within, adsorbed or absorbed in, or on, a support or carrier.

The terms "support" or "carrier" are used interchangeably and are any support material, preferably a porous support material, more preferably an inorganic support or an organic support. Inorganic supports are preferred for example inorganic oxides and inorganic chlorides. Other carriers include resinous support materials such as polystyrene, functionalized or crosslinked organic supports, such as polystyrene divinyl benzene polyolefins or polymeric compounds, zeolites, clays, talc, or any other organic or inorganic support material and the like, or mixtures thereof. The most preferred carriers are inorganic oxides that include those Group 2, 3, 4, 5, 13 or 14 metal oxides. The preferred supports include silica, alumina, silica-alumina, magnesium chloride, and mixtures thereof.

Other useful supports include magnesia, titania, zirconia, montmorillonite (EP-B1 0 511 665) and the like. Also, combinations of these support materials may be used, for example, silica-chromium, silica-alumina, silica-titania and the like.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu m$. More preferably, the surface area of the carrier is in the range of from about 50 to about 500 $m^2/g$, pore volume of from about 0.5 to about 3.5 cc/g and average particle size of from about 10 to about 200 $\mu m$. Most preferably the surface area of the carrier is in the range is from about 100 to about 400 $m^2/g$, pore volume from about 0.8 to about 3.0 cc/g and average particle size is from about 5 to about 100 $\mu m$. The average pore size of the carrier of the invention typically has pore size in the range of from 10 to 1000 Å, preferably 50 to about 500Å, and most preferably 75 to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664 and 5,846,895 and U.S. application Ser. No. 271,598 filed Jul. 7, 1994 and Ser. No. 788,736 filed Jan. 23, 1997 and PCT publications WO 95/32995, WO 95/14044, WO 96/06187 and WO 97/02297, and EP-B1-0 685 494 all of which are herein fully incorporated by reference. Examples of supporting conventional-type transition metal catalyst compounds are also well known in the art.

There are various other methods in the art for supporting a polymerization catalyst compound or catalyst system of the invention. For example, the bulky ligand metallocene-type catalyst compound of the invention may contain a polymer bound ligand as described in U.S. Pat. Nos. 5,473,202 and 5,770,755, which is herein fully incorporated by reference; the bulky ligand metallocene-type catalyst system of the invention may be spray dried as described in U.S. Pat. No. 5,648,310, which is herein fully incorporated by reference; the support used with the bulky ligand metallocene-type catalyst system of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a supported bulky ligand metallocene-type catalyst system that includes an antistatic agent or surface modifier that is used in the preparation of the supported catalyst system as described in PCT publication WO 96/11960, which is herein fully incorporated by reference. The catalyst systems of the invention can be prepared in the presence of an olefin, for example hexene-1.

In another embodiment, the bulky ligand metallocene-type catalyst system can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998.

A preferred method for producing the supported bulky ligand metallocene-type catalyst system of the invention is described below and is described in U.S. application Ser. No. 265,533, filed Jun. 24, 1994 and Ser. No. 265,532, filed Jun. 24, 1994 and PCT publications WO 96/00245 and WO 96/00243 both published Jan. 4, 1996, all of which are herein fully incorporated by reference. In this preferred method, the bulky ligand metallocene-type catalyst compound is slurried in a liquid to form a metallocene solution and a separate solution is formed containing an activator and a liquid. The liquid may be any compatible solvent or other liquid capable of forming a solution or the like with the bulky ligand metallocene-type catalyst compounds and/or activator of the invention. In the most preferred embodiment the liquid is a cyclic aliphatic or aromatic hydrocarbon, most preferably toluene. The bulky ligand metallocene-type catalyst compound and activator solutions are mixed together and added to a porous support or the porous support is added to the solutions such that the total volume of the bulky ligand metallocene-type catalyst compound solution and the activator solution or the bulky ligand metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the metal of the supported bulky ligand metallocene-type catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the bulky ligand metallocene-type catalyst is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of the conventional-type transition metal catalyst system and/or a bulky ligand metallocene-type catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference. In this embodiment, the prepolymerization is either in the presence of the at least two compounds, preferably the acid and base compounds, or the at least two compounds are added after the prepolymerization, but prior to the main polymerization, or simply added to the reactor with a already formed prepolymerized catalyst or a combination thereof. For the purposes of this patent specification and appended claims only, prepolymerization is considered a method for immobilizing a catalyst system and therefore considered to form a supported catalyst system.

Compound Combinations

There are various compounds that can be used to form a catalyst inhibitor to control the kinetics of an olefin polymerization catalyst. In the preferred embodiment, the invention relates to the use of two or more different compounds in the presence of a polymerization catalyst that react at a specified temperature during a polymerization process to release at least one catalyst inhibitor. In one embodiment, at least one of the compounds having a weight loss of no greater than 20 weight percent, preferably less than 10 weight percent, more preferably less than 5 weight percent, even more preferably less than 2 weight percent and most preferably less than 1 weight percent measured using a standard thermogravimetric analysis (TGA) at 80° C. for 20 minutes. In another embodiment of the invention at least one of the compounds has a dielectric constant greater than 2, preferably greater than 5, more preferably greater than 10 and/or a melting temperature in the range of from 0° C. to 200° C., preferably from 10° C. to 180° C., more preferably from 40° C. to 150° C., and most preferably from 80° C. to 130° C. Other compounds include at least one oxidant or at least one reductant. The most preferred compounds are acid and base combinations, specifically Bronsted acids and Bronsted bases. Combinations of acid/base and oxidant/reductant are also contemplated for use in the present invention. In addition to the preferred acid/base combinations, non-limiting examples of others include one or more of: 1) dithiodibutyric acid and $KNO_3$; 2) condensation of a carbonyl compound with an amine to give an imine and water; 3) reaction of an aldehyde and a rhodium-based catalyst to liberate carbon monoxide; 4) condensation of an aldehyde and a ketone, or two aldehydes, to give an unsaturated carbonyl product and water; 5) oxidative decarboxylation of acids with lead tetraacetate to give olefins and carbon dioxide; and 6) oxidative cleavage of 1,2-diols with periodic acid to yield two aldehydes. All of these combination of compounds can be used with polymerization catalysts in a polymerization process of the invention so as to release a catalyst inhibitor.

Acid and Base Compounds

It is preferred that the acid and base compounds, preferably Bronsted acid and Bronsted base compounds, when combined or contacted with each other are essentially or completely unreactive with one another under certain conditions. These conditions depend on for example, the particular polymerization process in which they are to be used and/or the delivery mechanism for their introduction to a reactor. However, when combined or contacted with each at another set of conditions, for example under polymerization conditions, they react to form a catalyst inhibitor that will essentially or completely render a catalyst system catalytically inactive.

The acid compounds may be represented by the following general formula:

where X—H is an acid, preferably a Bronsted acid (Bronsted, J. N. Rec. Trav. Chim. 1923, 42, 718), with a pKa of less than 20, preferably less than 15, more preferably less than 10, most preferred less than 5. Some classes of Bronsted acids include ketones, alcohols, ammonium salts, nitriles, nitro compounds, acetylenes, phenols, carboxylic acids and mineral acids. Examples of these classes include acetophenone, adamantanol, anilinium chloride, diphenylacetonitrile, picrolonic acid, phenylacetylene, phenol, benzoic acid and tungstic acid. Most preferred are carboxylic acids, including o-toluic acid, tropic acid, 4-octyloxybenzoic acid, 4-bromophenylacetic acid, 2-phenoxybenzoic acid, 3,4,5-triethoxybenzoic acid and 2,4-dimethoxybenzoic acid.

Especially preferred are acids having a high density of functional groups, such as malic acid and glutaric acid.

Non-limiting examples of acid compounds include 3-methyladipic acid, DL-malic acid, tropic acid, glutaric acid, ketoglutaric acid, pimelic acid, mandelic acid, 3-t-butyladipic acid and L-malic acid.

The base compounds may be represented by the following general formula:

where X—B is a base, preferably Bronsted base, where the conjugate acid has a pKa of greater than −5 and most preferably greater than 0. Some classes of Bronsted bases include enolate anions, alkoxides, hydroxides, amides, deprotonated nitrites and nitro compounds, acetylides, phenoxides, carboxylates and various mineral salts. Examples of these classes include lithium acetophenone enolate, lithium adamantanoxide, sodium amide, sodium diphenylacetonitrile, sodium picrolonate, lithiumphenylacetylene, potassium phenoxide, magnesium benzoate, and cesium tungstate. More preferred are compounds, which upon conversion to the base form become volatile, and thus, are more capable of rendering the catalyst inactive. Examples of these include lithium carbonate, calcium carbonate, potassium bicarbonate, sodium hydroxide, lithium methoxide, magnesium phenoxide, potassium acetate and lithium acetonate. Most preferred are carbonate and hydroxide salts.

Non-limiting examples of base compounds include potassium carbonate, calcium carbonate, sodium carbonate, barium carbonate, zinc carbonate hydroxide hydrate, magnesium carbonate hydroxide hydrate, calcium hydroxide, sodium hydroxide, magnesium hydroxide and aluminum hydroxide.

In the most preferred embodiment, the acid compound or the base compound are solids, preferably both the acid and the base compound are solids.

The conditions at which the catalyst inhibitor is produced may be controlled by varying the acid and base compounds, most preferably the acid compound. A preferred way for tuning the reaction of the acid and base compounds is by changing the temperature at which the catalyst inhibitor is formed. This may be done by choosing the melting temperature of the acid compound or the base compound. In one embodiment, the acid compound and/or the base compound has a melting point in the range of from 50° C. to about 130° C., preferably in the range of from about 60° C. to about 120° C., more preferably in the range of from 70° C. to about 110° C., and most preferably in the range of from 80° C. to about 105° C.

In another embodiment, the acid compound or the base compound has a melting point greater than 60° C., preferably greater than 70° C., more preferably greater than 75° C., and most preferably greater than 80° C.

In one preferred embodiment, the acid/base combination is tropic acid with lithium carbonate. Other acid/base combinations, one or more acids with one or more bases, include the acids: glutaric acid, methyl adipic acid, L-malic acid, 4-octyloxybenzoic acid, 3-t-butyladipic acid, ketoglutaric acid, tropic acid and DL-malic acid; with the following bases: lithium carbonate, sodium carbonate, potassium carbonate, calcium carbonate, calcium hydroxide, magnesium hydroxide and magnesium carbonate hydroxide.

The preferred combinations of the acid and base compounds are those that react quickly and release a catalyst inhibitor in high yield. Moreover, it was found that the light-off temperature for the catalyst inhibitor release does not entirely depend on the melting point(s) of the acid/base components but can be tuned by proper selection of the acid-base pair. The melting point of the acid and/or base may be controlled in an embodiment using dopants or mixtures of acid and/or base compounds.

Insolubility in hydrocarbons is indispensable for slurry and solution phase reactions. If desired, a third component (adjuvant) can be added that facilitates the reaction of the acid with the base (e.g., a fluxing agent). This adjuvant might also precipitate the reaction between the acid and base by virtue of melting at the selected temperature. Examples of preferred combinations include L-malic acid with calcium carbonate, DL-malic acid with potassium carbonate, tropic acid with lithium carbonate, octyloxybenzoic acid with sodium carbonate and L-malic acid with magnesium hydroxide. Examples of adjuvants might include aluminum distearate, sodium dodecylbenenesulfonate, polyethylene glycol and potassium laurate.

In an embodiment, one of either the acid or the base may have a lower melting point than the other, however, it is preferred that acid and base compounds are solids in the temperature range of from 25° C. to normal reaction conditions of temperature in the reactor during polymerization. Normal polymerization temperatures vary depending on the process used and/or the polymer produced. Typically polymerization temperatures in a gas phase process are in the range of 50° C. to about 120° C., more preferably from about 60° C. to about 110° C., most preferably from about 65° C. to about 100° C. Other polymerization temperatures are discussed later in this patent specification. In addition, in one embodiment, the two different compounds, preferably the acid and base compounds react at a temperature that is greater than 5° C. above the polymerization temperature.

The most preferred acid compounds generally include di- and tri-acids having a very low vapour pressure, a low hydrocarbon solubility, preferably no vapor pressure. Also preferred are acid compounds that have a low toxicity.

Other preferred properties for the acid and base compounds include the following considerations: 1) tunable so that its onset temperature (acid/base reaction) can be customized for a given process; 2) low toxicity; 3) not volatile as a solid; 4) responds quickly over a narrow temperature range; 5) gives a high yield of catalyst inhibitor(s) on a weight basis; 6) unaffected by the type of catalyst; 7) operates under various reactor conditions; 8) evenly distributed throughout the reactor, and preferably does not enter the recycle line; 9) not significantly affect the pelletizing process; 10) not adversely affect downstream polymer properties; and 11) easily handled.

In a preferred embodiment, the acid and base compounds are polar compounds where the acid compound has at least one —OH functionality and the base compound has at least one —O functionality, preferably a —CO functionality. Most preferably these polar compounds are insoluble in aliphatic hydrocarbons.

The most preferred combination is L-malic acid and a carbonate compound, preferably calcium carbonate. The reaction of malic acid and calcium carbonate results in the generation of at least two non-limiting examples of catalyst inhibitors, water and carbon dioxide. Other by-products that may be formed include calcium maleate. Other possible non-limiting catalyst inhibitors include alcohols, ketones, acetylenes, dienes, ammonia, amines, carboxylic acids, nitrites, nitro compounds.

In an embodiment, the acid and base compounds are used in a mole ratio of from 50:1 to 1:15, preferably from about 2:1 to 1:2.

Methods for Using the Combination of Compounds

The use of the at least two different compounds, preferably the acid and base compounds, of the invention can vary. For example, the acid and base compounds can be added or introduced with or without a catalyst directly to a polymerization process. The acid and base compounds may be combined prior to introducing them to a polymerization process, or the acid and base compounds may be added separately and/or simultaneously to the reactor. In an embodiment, the acid and base compounds are contacted with a catalyst compound prior to being introduced to the reactor. In an alternative embodiment, the acid compound is contacted with the catalyst compound and the base compound is added separately. Other embodiments may include placing the acid compound and/or the base compound and/or oxidant and/or reductant on a support material and then introducing the support material to the polymerization reactor.

The at least two compounds, preferably the acid and base compounds, may be introduced in one embodiment in the recycle stream of a gas phase polymerization process or below the distributor plate or in a region within the reactor where the tendency for sheeting to occur is high. The details of a gas phase polymerization process is discussed later in this patent specification.

In yet another embodiment, the at least two compounds, preferably the acid and base compounds, are used in combination with an unsupported catalyst system.

In the most preferred embodiment, the acid and base compounds are used with a supported catalyst system. A most preferred method for making a supported catalyst system of the invention generally involves the combining, contacting, blending, bonding and/or mixing any of the above described catalyst compounds, preferably a bulky ligand metallocene-type catalyst compound using any of the techniques previously described.

In one embodiment of the method of the invention, a catalyst compound is combined, contacted, bonded, blended, and/or mixed with at least one acid compound and at least one base compound or with at least one reductant and at least one oxidant. In a most preferred embodiment, the catalyst compound is a conventional-type transition metal catalyst and/or a bulky ligand metallocene-type catalyst supported on a carrier. In one embodiment, the acid and base compounds are in a mineral oil slurry with or without a catalyst system, preferably with a supported catalyst system that is introduced to a polymerization process. It is possible to improve the flow to a reactor of a polymerization catalyst having been combined with the acid/base combination using Kaydol 350 mineral oil or a flow aid such as TS 610 Cabosil, available from Cabot Corporation, Tuscola, Ill.

In one embodiment, the flow and the performance of the acid/base interaction is improved by modifying the particle size of the acid compound and/or the base compound. In a preferred embodiment, the particle size of the acid and/or base compound is less than $100\mu$, preferably less than $50\mu$.

In another embodiment, the steps of the method of the invention include forming a polymerization catalyst, preferably forming a supported polymerization catalyst, and contacting the polymerization catalyst, preferably the supported polymerization catalyst, with at least one acid compound and at least one base compound and/or at least one reductant and at least one oxidant. In a preferred method, the polymerization catalyst comprises a catalyst compound, an activator and a carrier, preferably the polymerization catalyst is a supported bulky ligand metallocene-type catalyst.

In one embodiment of the method of the invention at least two different compounds, preferably the acid and base compounds, are contacted with the catalyst system, preferably a supported catalyst system, most preferably a supported bulky ligand metallocene-type catalyst system under ambient temperatures and pressures. Preferably the contact temperature for combining the polymerization catalyst and the acid and base compounds is in the range of from 0° C. to about 100° C., more preferably from 15° C. to about 75° C., most preferably at about ambient temperature and pressure.

In a preferred embodiment, the contacting of the polymerization catalyst and the at least two compounds, preferably the acid and base compounds, is performed under an inert gaseous atmosphere, such as nitrogen. However, it is contemplated that the combination of the polymerization catalyst and the acid and base compounds may be performed in the presence of olefin(s), solvents, hydrogen and the like.

In one embodiment, the acid and/or base compounds and/or oxidant and reductant may be added at any stage during the preparation. It is understood by those in the art that in choosing acid/base compound pairs for example, that the compounds do not react with each other in a substantial way, preferably not during preparation.

In one embodiment of the method of the invention, the polymerization catalyst and the acid and base compounds are combined in the presence of a liquid, for example the liquid may be a mineral oil, toluene, hexane, isobutane or a mixture thereof. In a more preferred method the acid and base compounds are combined with a polymerization catalyst that has been formed in a liquid, preferably in a slurry, or combined with a substantially dry or dried, polymerization catalyst that has been placed in a liquid and reslurried.

Preferably, prior to use, the polymerization catalyst is contacted with the acid and base compounds for a period of time greater than a second, preferably from about 1 minute to about 48 hours, more preferably from about 10 minutes to about 10 hours, and most preferably from about 30 minutes to about 6 hours. The period of contacting refers to the mixing time only.

In an embodiment, the mole ratio of the base and acid compounds to the metal of the polymerization catalyst is the range from 5000 to about 0.2, preferably from about 1000 to about 0.5, more preferably from about 500 to about 1, and most preferably from about 250 to about 10.

In another embodiment, the weight ratio of the base and the acid compounds to the weight of the polymerization catalyst (including support if a supported polymerization catalyst) is the range from 100 to 0.001, preferably from about 10 to about 0.01, more preferably from 5 to 0.1, and most preferably from 2 to about 0.2.

Mixing techniques and equipment contemplated for use in the method of the invention are well known. Mixing techniques may involve any mechanical mixing means, for example shaking, stirring, tumbling, and rolling. Another technique contemplated involves the use of fluidization, for example in a fluid bed reactor vessel where circulated gases provide the mixing. Non-limiting examples of mixing equipment for combining, a solid polymerization catalyst and the acid and base compounds include a ribbon blender, a static mixer, a double cone blender, a drum tumbler, a drum roller, a dehydrator, a fluidized bed, a helical mixer and a conical screw mixer.

In a preferred embodiment of the invention the catalyst system of the invention is supported on a carrier, preferably the supported catalyst system is substantially dried, preformed, substantially dry and/or free flowing. In an especially preferred method of the invention, the preformed supported catalyst system is contacted with at least one acid compound and at least one base compound. The acid and base compounds may be in solution or slurry or in a dry state, preferably the acid and base compounds are in a substantially dry or dried state.

In an embodiment, the method of the invention provides for co-injecting an unsupported polymerization catalyst and the acid and base compounds or oxidant and reductant into the reactor. In one embodiment the polymerization catalyst is used in the unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with the acid and base compounds together or separately to a reactor using the injection methods described in PCT publication WO 97/46599, which is fully incorporated herein by reference. Where an unsupported bulky ligand metallocene-type catalyst system is used the mole ratio of the metal of the activator component to the metal of the bulky ligand metallocene-type catalyst compound is in the range of between 0.3:1 to 10,000:1, preferably 100:1 to 5000:1, and most preferably 500:1 to 2000:1.

In one embodiment, the polymerization catalyst has a productivity greater than 1500 grams of polymer per gram of catalyst, preferably greater than 2000 grams of polymer per gram of catalyst, more preferably greater than 2500 grams of polymer per gram of catalyst and most preferably greater than 3000 grams of polymer per gram of catalyst. In one embodiment, when the at least two different compounds, preferably the acid and base compounds of the invention, react to form a catalyst inhibitor, the polymerization catalyst productivity is reduced to less than 1500 grams of polymer per gram of catalyst, preferably less than 1000 grams of polymer per gram of catalyst, more preferably less than 500 grams of polymer per gram of catalyst, even more preferably less than 100 grams of polymer per gram of catalyst, and still even more preferably less than 25 grams of polymer per gram of catalyst and most preferably to less than is measurably possible or 0 grams of polymer per gram of catalyst.

The at least two different compounds, preferably the acid and base, may be used together or the acid used separately from the base, with or separate from the catalyst. In one embodiment, a binder is used to hold the at least two different compounds, the acid to the base, the acid or the base to the catalyst, or the acid and the base and the catalyst, or simply to facilitate the reaction between the acid and the base. While not wishing to be bound to any theory, binders may help facilitate the reaction of the acid and base. Also, a support material and/or a flow aid can be included. The binder may be added to the catalyst in any number of ways, for instance the binder can be added just after the catalyst is made and is still in a slurry state or prior to evaporation of any liquid in which the catalyst was prepared. Non-limiting examples of binders include polyethylene oxide, polyethylene/propylene oxide, mineral oil, silica, alumina, silicone oil, various waxes such as carnauba wax, surfactants such as sodium dodecylbenzene sulfonate and chelating agents such as EDTA.

The at least two different compounds, preferably the acid and base components may be combined with agents that would facilitate the reaction between the acid and base components at the trigger temperature and/or help dissipate static charge build up and/or modify the flow properties of the material and/or improve free flow of powders by reducing powder bed packing, decreasing particle coherence, and reducing interparticle friction. Non-limiting examples of these agents include silica such as cabosil, clays, surfactants such as esters of fatty acids, metal salts of fatty acids, silica, metal halides, solvated metal halides, amines, polyoxyethylene and polyoxypropylene and their derivatives, and sulfonates.

Polymerization Process

The catalyst system including the at least two different compounds, the acid and base compounds, and the oxidants and reductants of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene-type catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C. For purposes of this patent specification and appended claims the terms "polymerization temperature" and "reactor temperature" are interchangeable.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference A preferred process of the invention is where the process, preferably a slurry or gas phase process is operated in the presence of a bulky ligand metallocene-type catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352 and 5,763,543, which are herein fully incorporated by reference.

Polymer Product of the Invention

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 30, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene-type catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene-type catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The polymerization catalyst used in the examples below was prepared similarly to the following preparation. The bridged, bulky ligand metallocene-type catalyst compound was dimethylsilyl-bis(tetrahydroindenyl)zirconium dichloride ($Me_2Si(H_4Ind)_2ZrCl_2$) available from Albemarle Corporation, Baton Rouge, La. The ($Me_2Si(H_4Ind)_2ZrCl_2$) catalyst compound was supported on Crosfield ES-70 grade silica dehydrated at 600° C. having approximately 1.0 weight percent water Loss on Ignition (LOI). LOI is measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

The first step in the manufacture of the supported bulky ligand metallocene-type catalyst above involves forming a precursor solution. 460 lbs (209 kg) of sparged and dried toluene is added to an agitated reactor after which 1060 lbs (482 kg) of a 30 weight percent methylaluminoxane (MAO) in toluene (available from Albemarle, Baton Rouge, La.) is added. 947 lbs (430 kg) of a 2 weight percent toluene solution of a dimethylsilyl-bis(tetrahydroindenyl) zirconium dichloride catalyst compound and 600 lbs (272 kg) of additional toluene are introduced into the reactor. The precursor solution is then stirred at 80° F. to 100° F. (26.7° C. to 37.8° C.) for one hour.

While stirring the above precursor solution, 850 lbs (386 kg) of 600° C. Crosfield dehydrated silica carrier is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl) octadecylamine (($C_{18}H_{37}N(CH_2CH_2OH)_2$) available as Kemamine AS-990 from Witco Corporation, Memphis, Tenn., is added together with an additional 110 lbs (50 kg) of a toluene rinse and the reactor contents then is mixed for 30 min. while heating to 175° F. (79° C.). After 30 min. vacuum is applied and the polymerization catalyst mixture dried at 175° F. (79° C.) for about 15 hours to a free flowing powder. The final polymerization catalyst weight was 1200 lbs (544 kg) and had a Zr wt % of 0.35 and an Al wt % of 12.0.

Examples 1 to 7

A one liter 316 SS reactor with air-operated helical stirrer and an outer steam-heated shell and a inner acetone heat-transfer shell was dried by heating to 115° C. while purging with 500 sccm of nitrogen for 30 minutes. After cooling to 90° C., it was charged with 100 g of polyethylene (granular Union Carbide grade DSX4810 (available from Union Carbide Corporation, Danbury, Conn.), Cr-based, 0.948 density, $I_{10}$=10, unstabilized) under inert conditions and pressure/vented four times with 100 psi (690 kPa) nitrogen. A solution of 100 micromoles of tri-isobutylaluminum (TIBA) was then added and the reactor sealed and pressure/vented three times with 100 psi (690 kPa) ethylene before bringing the reactor to reactor conditions, 80° C. and 107 psi (738 kPa).

A catalyst charging vessel comprising a ¼ inch (2 cm) SS tube isolated between two valves and attached to a reservoir of nitrogen was charged with 60.7 mg supported polymerization catalyst as described above in a nitrogen-filled glove box and attached to the reactor against a nitrogen purge. The reactor was then pressurized and vented three times with ethylene. The reactor was then brought to 80° C., 107 psi (738 kPa) and the catalyst injected. After 38 minutes the temperature was ramped to 100° C. during 5 minutes and held for 40 minutes. The ideal combination of acid and base compounds for purposes of these experiments below will have no effect on the catalyst activity at 80° C. but will substantially reduce catalyst activity at 100° C.

Table 1 represents the control experiments, where no acid compound or base compound was used with the polymerization catalyst. Controls: These illustrate that without the acid or base, catalyst activity is substantial at the higher temperature range, 100° C. in these examples.

TABLE 1

| Ex. | Acid | Base | Activity[1] | Rubble (%) | Uptake 80° C. | Uptake 100° C. | Uptake 100° C./80° C. | % rate redn @ 20 min |
|---|---|---|---|---|---|---|---|---|
| 1 | none | none | 11847 | 8% | 14.9 | 31.3 | 2.1 | −11% |
| 2 | none | none | 10595 | 6% | 15.1 | 26.4 | 1.8 | 1% |
| 3 | none | none | 13120 | 9% | 17.9 | 30.3 | 1.7 | −6% |
| 4 | none | none | 12401 | 28% | 17.9 | 32.3 | 1.8 | 0% |
| 5 | none | none | 12461 | 26% | 16.2 | 31.5 | 1.9 | −18% |
| 6 | none | none | 12461 | 18% | 18.7 | 30.9 | 1.7 | −6% |
| 7 | none | none | 14219 | 15% | 16.5 | 36.4 | 2.2 | 4% |
| Average | | | 12443 | 16% | 16.7 | 31.3 | 1.9 | −5% |
| Standard Deviation | | | 1110 | 9% | 1.5 | 3.0 | 0.2 | 8% |

[1]Activity is measured as grams of polyethylene/mmol Zr/hour/100 psi (690 kPa) ethylene Examples 8 to 12

As in Example 1 except that 45 mg of a 1:1 mole:mole mixture of calcium carbonate and L-malic acid was charged to the catalyst charging vessel and injected with nitrogen pressure at 20 minutes during the 80° C. segment of the run.

Table 2 illustrates the acid/base pair reproducibly limit catalyst activity at the higher temperature. Rubble is also reduced, indicating improved continuity.

Examples 13 and 14

As in example 8 except that the time of injection is changed from 20 minutes to 10 minutes in Example 13 and 30 minutes in Example 14. Examples 13 and 14 illustrate that the acid/base combination can be added at various times without debit in catalyst activity before the higher temperature period is reached.

Example 15

As in Example 8 except the acid/base compounds comprises a 1:1 mole:mole mixture of potassium carbonate and L-malic acid (30 mg).

TABLE 2

| Ex. | Acid | Base | Activity | Rubble (%) | Uptake 80° C. | Uptake 100° C. | Uptake 100° C./80° C. | % rate redn @ 20 min |
|---|---|---|---|---|---|---|---|---|
| 8 | L-malic | CaCO$_3$ | 6474 | 1% | 12.80 | 10.08 | 0.79 | 18% |
| 9 | L-malic | CaCO$_3$ | 3548 | 3% | 9.87 | 4.81 | 0.49 | 31% |
| 10 | L-malic | CaCO$_3$ | 4252 | 2% | 13.07 | 4.75 | 0.36 | 9% |
| 11 | L-malic | CaCO$_3$ | 6676 | 8% | 16.60 | 12.37 | 0.75 | 0% |
| 12 | L-malic | CaCO$_3$ | 6750 | 10% | 14.81 | 13.65 | 0.92 | 7% |
| 13 | L-malic | CaCO$_3$ | 6430 | 4% | 14.98 | 12.12 | 0.81 | −21% |
| 14 | L-malic | CaCO$_3$ | 6604 | 6% | 13.31 | 12.75 | 0.96 | −7% |
| 15 | L-malic | K$_2$CO$_3$ | 5192 | 5% | 12.75 | 7.27 | 0.57 | 37% |

[1]Activity is measured as grams of polyethylene/mmol Zr/hour/100 psi (690 kPa) ethylene Example 16

As in Example 8 except that the acid/base compounds are slurried in mineral oil (10% wt./vol.) and injected with 5 mL hexane.

Example 17

As in Example 15 except that the acid/base compounds is slurried in mineral oil (10% wt./vol.) and injected with 5 mL hexane.

TABLE 3

| Ex | Acid | Base | Activity | Rubble (%) | Uptake 80° C. | Uptake 100° C. | Uptake 100° C./80° C. | % rate redn @ 20 min |
|---|---|---|---|---|---|---|---|---|
| 16 | L-malic | CaCO$_3$ | 8979 | 5% | 15.54 | 17.68 | 1.14 | −25% |
| 17 | L-malic | K$_2$CO$_3$ | 3798 | 3% | 11.97 | 3.42 | 0.29 | 21% |

[1]Activity is measured as grams of polyethylene/mmol Zr/hour/100 psi (690 kPa) ethylene

Examples 18 and 19

As in Example 8 except the acid/base compounds are co-mixed with the polymerization catalyst.

Example 20

As in Example 15 except the acid/base compounds are co-mixed with the polymerization catalyst.

TABLE 4

| Ex. | Acid | Base | Activity | Rubble (%) | Uptake 80° C. | Uptake 100° C. | Uptake 100° C./ 80° C. |
|---|---|---|---|---|---|---|---|
| 18 | L-malic | CaCO$_3$ | 9376 | 3% | 17.04 | 18.94 | 1.11 |
| 19 | L-malic | CaCO$_3$ | 5614 | 2% | 12.20 | 10.54 | 0.86 |
| 20 | L-malic | K$_2$CO$_3$ | 2249 | 8% | 5.85 | 3.75 | 0.64 |

[1]Activity is measured as grams of polyethylene/mmol Zr/hour/100 psi (690 kPa) ethylene

Example 21

As in Examples 18 and 19 except that the acid/base compound is slurried with the polymerization catalyst in toluene and then evaporated to a powder.

TABLE 5

| Ex. | Acid | Base | Activity | Rubble (%) | Uptake 80° C. | Uptake 100° C. | Uptake 100° C./ 80° C. |
|---|---|---|---|---|---|---|---|
| 21 | L-malic | CaCO$_3$ | 6317 | 2% | 15.05 | 8.38 | 0.56 |

[1]Activity is measured as grams of polyethylene/mmol Zr/hour/100 psi (690 kPa) ethylene

Examples 22 and 23

As in Examples 18 and 19 except that all components are slurried in mineral oil (10% wt./vol.) and injected with 5 mL hexane.

Examples 24 and 25

As in Example 20 except that all components are slurried in mineral oil (10% wt./vol.) and injected with 5 mL hexane.

TABLE 6

| Ex. | Acid | Base | Activity | Rubble (%) | Uptake 80° C. | Uptake 100° C. | Uptake 100° C./ 80° C. |
|---|---|---|---|---|---|---|---|
| 22 | L-malic | CaCO$_3$ | 8604 | 10% | 17.00 | 15.65 | 0.92 |
| 23 | L-malic | CaCO$_3$ | 10169 | 2% | 25.90 | 12.67 | 0.49 |
| 24 | L-malic | K$_2$CO$_3$ | 5492 | 2% | 15.85 | 5.32 | 0.34 |
| 25 | L-malic | K$_2$CO$_3$ | 6075 | 3% | 15.64 | 4.44 | 0.28 |

[1]Activity is measured as grams of polyethylene/mmol Zr/hour/100 psi (690 kPa) ethylene

Example 26

As in Example 8 except the acid and base are not combined with each other, rather the base is combined with the catalyst and the acid is injected alone at 20 minutes. Example 26 illustrates separately injecting the acid from the base to the reactor.

Example 27

As in Example 8 except the acid and base are not combined with each other, rather the acid is combined with the catalyst and the base is injected alone at 20 minutes. Example 27 illustrates separately injecting the acid from the base to the reactor.

Example 28

As in Example 15 except the acid and base are not combined with each other, rather the base is combined with the catalyst and the acid is injected alone at 20 minutes.

Example 29

As in Example 15 except the acid and base are not combined with each other, rather the acid is combined with the catalyst and the base is injected alone at 20 minutes.

Example 30

As in Example 29 except the base is slurried in mineral oil (10% wt./vol.) and injected with 5 mL hexane.

Example 31

As in Example 28 except the acid is slurried in mineral oil (10% wt./vol.) and injected with 5 mL hexane.

TABLE 7

| Ex. | Acid | Base | Activity | Rubble (%) | Uptake 80° C. | Uptake 100° C. | Uptake 100° C./80° C. | % rate redn @ 20 min |
|---|---|---|---|---|---|---|---|---|
| 26 | L-malic | CaCO$_3$ | 8556 | 2% | 15.56 | 17.79 | 1.14 | −8% |
| 27 | L-malic | CaCO$_3$ | 9316 | 3% | 16.01 | 20.45 | 1.28 | 49% |
| 29 | L-malic | K$_2$CO$_3$ | 4545 | 5% | 12.58 | 6.01 | 0.48 | 23% |
| 28 | L-malic | K$_2$CO$_3$ | 6324 | 4% | 14.35 | 10.43 | 0.73 | 0% |

TABLE 7-continued

| Ex. | Acid | Base | Activity | Rubble (%) | Uptake 80° C. | Uptake 100° C. | Uptake 100° C./80° C. | % rate redn @ 20 min |
|---|---|---|---|---|---|---|---|---|
| 30 | L-malic | K₂CO₃ | 6507 | 3% | 15.70 | 7.84 | 0.50 | −41% |
| 31 | L-malic | K₂CO₃ | 5659 | 4% | 13.97 | 6.35 | 0.45 | 0% |

[1]Activity is measured as grams of polyethylene/mmol Zr/hour/100 psi (690 kPa) ethylene

Example 32

As in Example 8 except that the acid/base mixture was prepared as follows: 6.7 g L-malic acid is dissolved in 25 mL acetone and slurried with 5.0 g calcium carbonate in a 100 mL round bottom flask before rotary evaporating to a solid and drying under vacuum at 75° C. overnight. In this Example 32 and Examples 33 and 34 below, the acid compound is bound to the base compound.

Example 33

As in Example 32 except that only 30 mg of acid/base mixture is used.

Example 34

As in Example 8 except that the acid-base mixture was prepared as follows: 13.4 g L-malic acid is dissolved in 46 mL acetone and added during 1.5 hrs to a mechanically 500 mL round bottom flask containing 10.0 g calcium carbonate heated to 50° C. and purged continuously with nitrogen. After the addition the material was dried at 75° C. under vacuum overnight.

Example 35 and 36

As in Example 27 but no L-malic acid was used. Examples 35 and 36 illustrate that the base compound without the acid has no effect without the acid.

Example 37

As in Example 8 except that 45 mg of a 1:1 mole:mole mixture of K₂CO₃ and tropic acid was used in place of L-malic acid/calcium carbonate.

TABLE 8

| Ex. | Acid | Base | Activity[1] | Rubble (%) | Uptake 80° C. | Uptake 100° C. | Uptake 100° C./80° C. | % rate redn @ 20 min |
|---|---|---|---|---|---|---|---|---|
| 32 | L-malic | CaCO₃ | 3806 | 7% | 13.68 | 4.55 | 0.33 | −18% |
| 33 | L-malic | CaCO₃ | 6108 | 2% | 15.91 | 7.49 | 0.47 | −2% |
| 34 | L-malic | CaCO₃ | 5068 | 5% | 17.32 | 3.46 | 0.20 | 5% |
| 35 | none | CaCO₃ | 13053 | 23% | 14.12 | 36.20 | 2.56 | −2% |
| 36 | none | CaCO₃ | 13812 | 12% | 15.78 | 37.18 | 2.36 | −2% |
| 37 | Tropic | K₂CO₃ | 8277 | 2% | 17.05 | 20.13 | 1.18 | −8% |

[1]Activity is measured as grams of polyethylene/mmol Zr/hour/100 psi (690 kPa) ethylene While the present invention has been described and illustrated by reference to particular embodiments, those of ordinary skill in the art will appreciate that the invention lends itself to variations not necessarily illustrated herein. For example, it is contemplated that a different combination of acid and base compounds may be used during the polymerization process depending on the product being produced. Also, two or more polymerization reactors, in series or parallel, slurry and/or gas phase may be used in which different combinations of acid and base compounds and/or oxidants and reductants may be used. Furthermore, the combination of acid and base compounds may be utilized downstream of the reactor to deactivate polymer withdrawn from a polymerization reactor. Also, two or more polymerization catalysts may be used with the acid/base and/or oxidant/reductant of the invention. For this reason, then, reference should be made solely to the appended claims for purposes of determining the true scope of the present invention.

We claim:

1. A catalyst composition comprising an olefin polymerization catalyst and at least two different solid compounds, which solid compounds react with each other above an onset temperature to form a polymerization catalyst inhibitor that deactivates the olefin polymerization catalyst, at least one compound being a carboxylic acid compound and at least one being a carbonate or hydroxide compound wherein the compounds do not react with each other to form a polymerization catalyst inhibitor below said onset temperature, said onset temperature being greater than 5° C. above the polymerization temperature in a polymerization reactor in which the catalyst composition is used, the polymerization temperature being in the range of from 50° C. to 120° C.

2. The catalyst composition of claim 1, wherein the carboxylic acid compound, carbonate, and hydroxide compound each has a melting point greater than 70° C.

3. The catalyst composition of claim 1, wherein the onset temperature is greater than 80° C.

4. The catalyst composition of claim 1 wherein the polymerization catalyst is supported.

5. The catalyst composition of claim 1 wherein both of the two different solid compounds have a weight loss of less than 20 weight percent measured using thermogravimetric analysis at 80° C. for 20 minutes.

6. The catalyst composition of claim 1 wherein at least one of the two different compounds has a dielectric constant greater than 2.

7. The catalyst composition of claim 1 wherein said olefin polymerization catalyst comprises at least one early transition metal metallocene.

8. The catalyst composition of claim 1, wherein the mole ratio of carboxylic acid compound to carbonate or hydroxide compound is from 2:1 to 1:2.

9. The catalyst composition of claim 1, wherein the carbonate or hydroxide compound is selected from the group consisting of potassium carbonate, calcium carbonate, sodium carbonate, barium carbonate, zinc carbonate hydroxide hydrate, magnesium carbonate hydroxide hydrate, calcium hydroxide, sodium hydroxide, magnesium hydroxide, lithium carbonate, potassium bicarbonate and aluminum hydroxide.

10. The catalyst composition of claim 1 wherein said polymerization catalyst inhibitor comprises carbon dioxide.

11. The catalyst composition of claim 1, wherein the carboxylic acid compound is selected from the group consisting of o-toluic acid, tropic acid, 4-octyloxybenzoic acid, 4-bromophenylacetic acid, 2-phenoxybenzoic acid, 3,4,5-triethoxybenzoic acid, 2,4-dimetlioxybeuzoic acid, 3-methyladipic acid, DL-malic acid, glutaric acid, ketoglutaric acid, pimelic acid, mandelic acid, 3-t-butyladipic acid and L-malic acid.

12. The catalyst composition of claim 1 wherein the mole ratio of the at least one carboxylic acid compound and the at least one carbonate or hydroxide compound is in the range of from 20 to 0.05.

* * * * *